United States Patent
Bauer et al.

(10) Patent No.: US 10,366,073 B2
(45) Date of Patent: Jul. 30, 2019

(54) SYSTEM FOR AUTOMATING DATA VALIDATION

(71) Applicant: BANK OF AMERICA CORPORATION, Charlotte, NC (US)

(72) Inventors: Robert J. Bauer, Middletown, DE (US); Stephen Isaac Early, Landenberg, PA (US); Mark Jeffrey Fawzi, West Grove, PA (US)

(73) Assignee: Bank of America Corporation, Charlotte, NC (US)

( * ) Notice: Subject to any disclaimer, the term of this patent is extended or adjusted under 35 U.S.C. 154(b) by 666 days.

(21) Appl. No.: 14/755,727

(22) Filed: Jun. 30, 2015

(65) Prior Publication Data

US 2017/0004167 A1    Jan. 5, 2017

(51) Int. Cl.
*G06F 16/23* (2019.01)
*G06F 16/25* (2019.01)

(52) U.S. Cl.
CPC ........ *G06F 16/2365* (2019.01); *G06F 16/258* (2019.01)

(58) Field of Classification Search
CPC ..................... G06F 17/30371; G06F 17/30569
USPC ....................................................... 707/690
See application file for complete search history.

(56) References Cited

U.S. PATENT DOCUMENTS

| | | | |
|---|---|---|---|
| 6,208,990 B1 | 3/2001 | Suresh et al. | |
| 7,484,096 B1 | 1/2009 | Garg et al. | |
| 8,019,795 B2 | 9/2011 | Anderson | |
| 8,024,369 B2 | 9/2011 | Pellegrini et al. | |
| 8,219,520 B2 | 7/2012 | Li et al. | |
| 8,725,701 B2 | 5/2014 | Parkes et al. | |
| 2009/0006282 A1* | 1/2009 | Roth | G06F 17/30303 706/12 |
| 2009/0125623 A1* | 5/2009 | Garg | H04L 9/3247 709/224 |
| 2011/0066602 A1* | 3/2011 | Studer | G06F 17/2264 707/690 |
| 2011/0246415 A1* | 10/2011 | Li | G06F 17/30592 707/602 |
| 2012/0165726 A1* | 6/2012 | Mantell | A61M 13/003 604/24 |
| 2012/0265726 A1 | 10/2012 | Padmanabhan et al. | |
| 2014/0188948 A1* | 7/2014 | Rubenstein | G06Q 30/06 707/821 |

(Continued)

FOREIGN PATENT DOCUMENTS

WO    WO 1999/052047    10/1999

*Primary Examiner* — Hosain T Alam
*Assistant Examiner* — Saba Ahmed
(74) *Attorney, Agent, or Firm* — Michael A. Springs; Moore & Van Allen PLLC; Anup Shrinivasan (57) ABSTRACT

Embodiments of the invention are directed to systems, methods, and computer program products for automating data validation. The system is configured to receive the initial data set in the first data structure from a network of distributed servers; transform the initial data set into an expected data set having the second data structure using a first mapping logic; use the expected data set to validate a converted data set that was generated by converting the initial data set into the second data structure using a second mapping logic; and transmit control signals configured to cause a user device associated with the user to receive a notification indicating that the match is within the pre-determined tolerance level.

17 Claims, 4 Drawing Sheets

(56) References Cited

U.S. PATENT DOCUMENTS

| | | |
|---|---|---|
| 2015/0020059 A1 | 1/2015 | Davis |
| 2015/0046389 A1 | 2/2015 | Dhayapule et al. |
| 2016/0179874 A1* | 6/2016 | Lynch .................... G01C 21/30 |
| | | 707/690 |

* cited by examiner

SYSTEM FOR AUTOMATING DATA VALIDATION

FIELD

In general, embodiments of the invention relate to data validation, in particular, embodiments of the invention relate to an automated system for data validation.

BACKGROUND

Data validation is the process of ensuring that data is clean, correct, and useful by providing well-defined guarantees for fitness, accuracy, and consistency of the data. In most applications, data may be shared between multiple applications running on a variety of platforms within an entity. In this regard, it is imperative that the data is integrated seamlessly between disparate applications. On a low scale, data translation may involve a user manually ensuring that the dataset being translated/moved between applications is accurate and flawless. With the increase in the number of entities using large volumes of data to analyze information, ensuring data accuracy manually may not be a feasible solution to guarantee the consistency of data.

There is a need for a system that provides automated data validation for large volumes of data accurately and efficiently.

BRIEF SUMMARY

Embodiments of the present invention address the above needs and/or achieve other advantages by providing apparatuses (e.g., a system, computer program product, and/or other device) and methods for automating data validation. The present invention provides the functional benefit of ensuring that the data being used is fit, accurate, and consistent across multiple platforms. The present invention further provides an efficient and scalable system to ensure accuracy, and provides intelligent reporting to identify potential issues in real-time or near real-time.

In one aspect, a system for automating data validation is presented. The system comprises one or more memory devices; and one or more processing devices operatively coupled to the one or more memory devices, wherein the one or more processing devices are configured to execute computer-readable program code to: receive the initial data set in the first data structure from a network of distributed servers; transform the initial data set into an expected data set having the second data structure using a first mapping logic, wherein transforming further comprises mapping one or more fields associated with the initial data set into one or more fields associated with the expected data set, wherein the transformed data is stored in a database as the expected data set; use the expected data set to validate a converted data set that was generated by converting the initial data set into the second data structure using a second mapping logic, wherein validating comprises: receiving the converted data set; comparing the one or more fields associated with the expected data set with one or more fields associated with the converted data set; determining a match between the one or more fields associated with the expected data set and the one or more fields associated with the converted data set based on at least the comparison; and determining that the match between the one or more fields associated with the expected data set and the one or more fields associated with the converted data set are within a pre-determined tolerance level, wherein the pre-determined tolerance level is customizable by a user; and transmit control signals configured to cause a user device associated with the user to receive a notification indicating that the match is within the pre-determined tolerance level.

In some embodiments, the module is configured to further cause the one or more processing devices to: determine that the match between the one or more fields associated with the expected data set and the one or more fields associated with the converted data set is outside the pre-determined tolerance level; transmit control signals configured to cause the user device associated with the user to receive a notification indicating that the match is outside the pre-determined tolerance level, wherein the notification comprises an option to enable the user to initiate a communicable link with the database; receive an indication that the user has initiated the communicable link; initiate a presentation of a user interface for display on the user device, wherein the user interface comprises one or more actions capable of being executed by the user to mitigate the mismatch to ensure that the match between the one or more fields associated with the expected data set and the one or more fields associated with the converted data set is within the pre-determined tolerance level; and transmit control signals configured to cause a user device associated with the user to receive a notification indicating that the match is within the pre-determined tolerance level, wherein the notification comprises an audible alert.

In some embodiments, the module is configured to further cause the one or more processing devices to: match the one or more fields associated with the expected data set with the one or more fields associated with the converted data set based on at least matching one or more elements of the one or more fields associated with the expected data set with one or more elements of the one or more fields associated with the converted data set, wherein each of the one or more elements comprises one or more sub-elements.

In some embodiments, the module is configured to further cause the one or more processing devices to: receive one or more tolerance levels associated with the matching of the one or more elements of the one or more fields associated with the expected data set and one or more elements of the one or more fields associated with the converted data set.

In some embodiments, the module is configured to further cause the one or more processing devices to: receive one or more weights associated with the one or more elements of the one or more fields associated with the expected data set and one or more elements of the one or more fields associated with the converted data set; calculate an overall tolerance level for matching each of the one or more fields associated with the expected data set and the one or more fields associated with the converted data set based on at least the one or more weights; and determine whether the match is within overall tolerance level.

In some embodiments, the first mapping logic comprises mapping the one or more fields associated with the initial data set to one or more fields associated with the expected data set comprises at least one of a one to one mapping, one to many mapping, many to many mapping, or many to one mapping, wherein one to one mapping comprises mapping each individual field associated with the initial data set to each individual field associated with the expected data set, wherein one to many mapping comprises mapping each individual field associated with the initial data set to a combination of one or more fields associated with the expected data set, wherein many to many mapping comprises mapping a combination of one or more fields associated with the initial data set to a combination of the one or more fields associated with the expected data set, wherein many to one mapping comprises mapping each individual field associated with the initial data set to a combination of the one or more fields associated with the expected data set.

In some embodiments, the module is further configured to further cause the one or more processing devices to: generate a report at pre-determined periods of time indicating a number of mismatches, wherein the report is generated during a time period when the validation is being performed; and transmit the report to the user via the user interface for display on the user device.

In another aspect, a computer program product for automating data validation is presented. The computer program product comprising a non-transitory computer-readable medium comprising code causing a first apparatus to: receive the initial data set in the first data structure from a network of distributed servers; transform the initial data set into an expected data set having the second data structure using a first mapping logic, wherein transforming further comprises mapping one or more fields associated with the initial data set into one or more fields associated with the expected data set, wherein the transformed data is stored in a database as the expected data set; use the expected data set to validate a converted data set that was generated by converting the initial data set into the second data structure using a second mapping logic, wherein validating comprises: receiving the converted data set; comparing the one or more fields associated with the expected data set with one or more fields associated with the converted data set; determining a match between the one or more fields associated with the expected data set and the one or more fields associated with the converted data set based on at least the comparison; and determining that the match between the one or more fields associated with the expected data set and the one or more fields associated with the converted data set are within a pre-determined tolerance level, wherein the pre-determined tolerance level is customizable by a user; and transmit control signals configured to cause a user device associated with the user to receive a notification indicating that the match is within the pre-determined tolerance level.

In yet another aspect, a computer implemented method for automating data validation is presented. The method comprising: receiving, using a computing device processor, the initial data set in the first data structure from a network of distributed servers; transforming, using a computing device processor, the initial data set into an expected data set having the second data structure using a first mapping logic, wherein transforming further comprises mapping one or more fields associated with the initial data set into one or more fields associated with the expected data set, wherein the transformed data is stored in a database as the expected data set; validating, using a computing device processor, the converted data set that was generated by converting the initial data set into the second data structure using a second mapping logic using the expected data set, wherein validating further comprises: receiving the converted data set; comparing the one or more fields associated with the expected data set with one or more fields associated with the converted data set; determining a match between the one or more fields associated with the expected data set and the one or more fields associated with the converted data set based on at least the comparison; and determining that the match between the one or more fields associated with the expected data set and the one or more fields associated with the converted data set are within a pre-determined tolerance level, wherein the pre-determined tolerance level is customizable by a user; and transmitting, using a computing device processor, control signals configured to cause a user device associated with the user to receive a notification indicating that the match is within the pre-determined tolerance level.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, an insurance account, a time deposit, a demand deposit, a pre-paid account, a credit account, a non-monetary user profile that includes only personal information associated with the user, or the like. The account is associated with and/or maintained by an entity. In other embodiments, an "entity" may not be a financial institution.

In some embodiments, the "user" may be a customer (e.g., an account holder or a person who has an account (e.g., banking account, credit account, brokerage account or the like) at the entity) or potential customer (e.g., a person who has submitted an application for an account, a person who is the target of marketing materials that are distributed by the entity, a person who applies for a loan that not yet been funded). In other embodiments, the "user" may refer to an employee of the entity.

Figure 1:
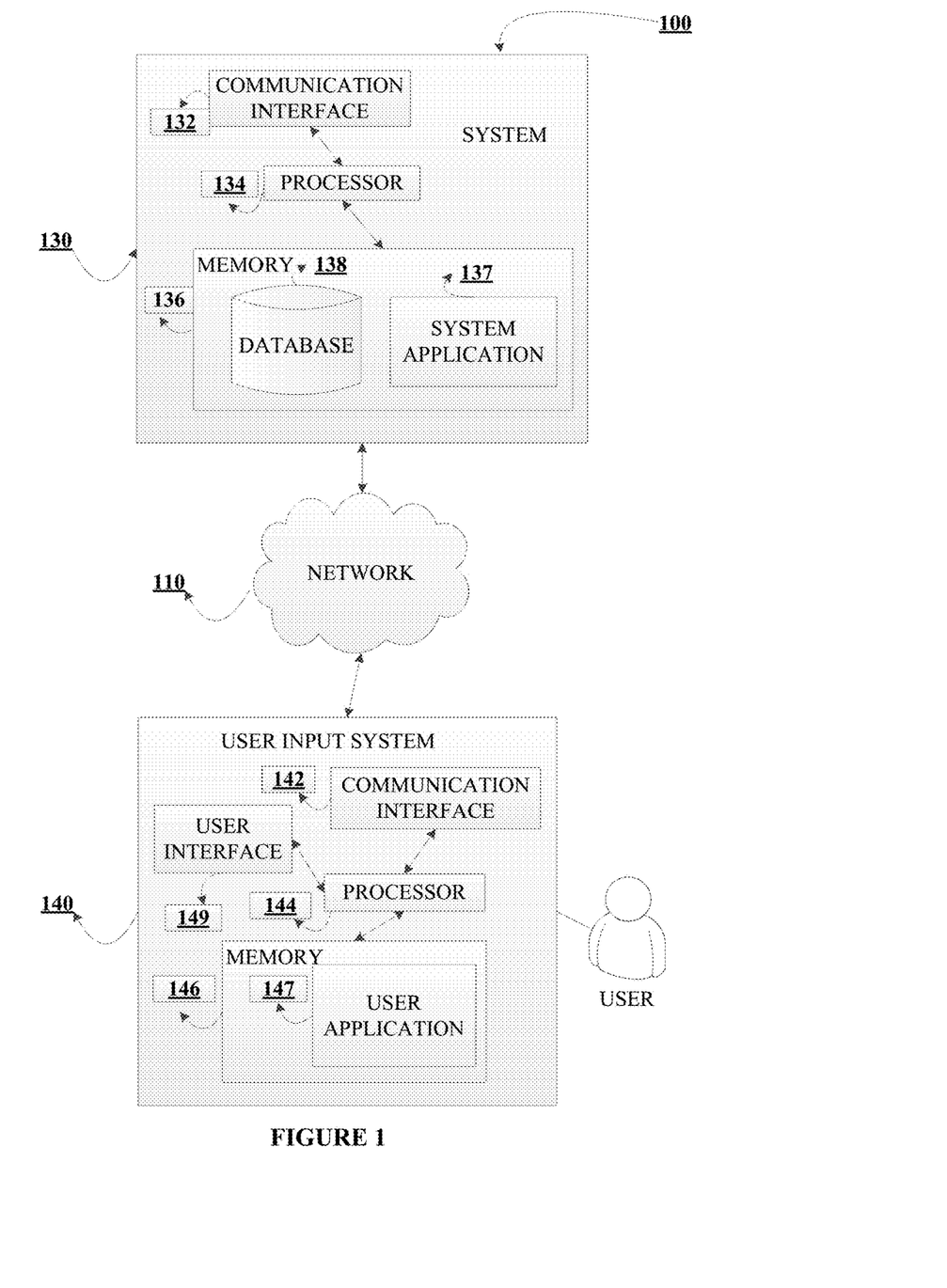
FIG. 1 illustrates an exemplary block diagram of the system environment in accordance with an aspect of the present invention.

FIG. 1 presents an exemplary block diagram of the system environment 100 for implementing the process flows described herein in accordance with embodiments of the present invention. As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute a user application 147. The user application 147 may be an application to communicate with the system 130, perform a transaction, input information onto a user interface presented on the user input system 140, or the like. The user application 147 and/or the system application 137 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

The user input system 140 may include any computerized apparatus that can be configured to perform any one or more of the functions of the user input system 140 described and/or contemplated herein. For example, the user may use the user input system 140 to transmit and/or receive information or commands to and from the system 130. In some embodiments, for example, the user input system 140 may include a personal computer system (e.g. a non-mobile or non-portable computing system, or the like), a mobile computing device, a personal digital assistant, a mobile phone, a tablet computing device, a network device, and/or the like. As illustrated in FIG. 1, in accordance with some embodiments of the present invention, the user input system 140 includes a communication interface 142, a processor 144, a memory 146 having an user application 147 stored therein, and a user interface 149. In such embodiments, the communication interface 142 is operatively and selectively connected to the processor 144, which is operatively and selectively connected to the user interface 149 and the memory 146. In some embodiments, the user may use the user application 147 to execute processes described with respect to the process flows described herein. Specifically, the user application 147 executes the process flows described herein.

Each communication interface described herein, including the communication interface 142, generally includes hardware, and, in some instances, software, that enables the user input system 140, to transport, send, receive, and/or otherwise communicate information to and/or from the communication interface of one or more other systems on the network 110. For example, the communication interface 142 of the user input system 140 may include a wireless transceiver, modem, server, electrical connection, and/or other electronic device that operatively connects the user input system 140 to another system such as the system 130. The wireless transceiver may include a radio circuit to enable wireless transmission and reception of information. Additionally, the user input system 140 may include a positioning system. The positioning system (e.g. a global positioning system (GPS), a network address (IP address) positioning system, a positioning system based on the nearest cell tower location, or the like) may enable at least the user input system 140 or an external server or computing device in communication with the user input system 140 to determine the location (e.g. location coordinates) of the user input system 140.

Each processor described herein, including the processor 144, generally includes circuitry for implementing the audio, visual, and/or logic functions of the user input system 140. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 147 of the memory 146 of the user input system 140.

Each memory device described herein, including the memory 146 for storing the user application 147 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 1, the memory 146 includes the user application 147. In some embodiments, the user application 147 includes an interface for communicating with, navigating, controlling, configuring, and/or using the user input system 140. In some embodiments, the user application 147 includes computer-executable program code portions for instructing the processor 144 to perform one or more of the functions of the user application 147 described and/or contemplated herein. In some embodiments, the user application 147 may include and/or use one or more network and/or system communication protocols.

Also shown in FIG. 1 is the user interface 149. In some embodiments, the user interface 149 includes one or more output devices, such as a display and/or speaker, for presenting information to the user. In some embodiments, the user interface 149 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user. In some embodiments, the user interface 149 includes the input and display devices of a mobile device, which are operable to receive and display information.

FIG. 1 also illustrates a system 130, in accordance with an embodiment of the present invention. The system 130 may refer to the "apparatus" described herein. The system 130 may include any computerized apparatus that can be configured to perform any one or more of the functions of the system 130 described and/or contemplated herein. In accordance with some embodiments, for example, the system 130 may include a computer network, an engine, a platform, a server, a database system, a front end system, a back end system, a personal computer system, and/or the like. Therefore, the system 130 may be a server managed by the business. The system 130 may be located at the facility associated with the business or remotely from the facility associated with the business. In some embodiments, such as the one illustrated in FIG. 1, the system 130 includes a communication interface 132, a processor 134, and a memory 136, which includes a system application 137 and a structured database 138 stored therein. As shown, the communication interface 132 is operatively and selectively connected to the processor 134, which is operatively and selectively connected to the memory 136.

It will be understood that the system application 137 may be configured to implement any one or more portions of the various user interfaces and/or process flow described herein. The system application 137 may interact with the user application 147. It will also be understood that, in some embodiments, the memory includes other applications. It will also be understood that, in some embodiments, the system application 137 is configured to communicate with the structured database 138, the user input system 140, or the like.

It will be further understood that, in some embodiments, the system application 137 includes computer-executable program code portions for instructing the processor 134 to perform any one or more of the functions of the system application 137 described and/or contemplated herein. In some embodiments, the system application 137 may include and/or use one or more network and/or system communication protocols.

In addition to the system application 137, the memory 136 also includes the structured database 138. As used herein, the structured database 138 may be one or more distinct and/or remote databases. In some embodiments, the structured database 138 is not located within the system and is instead located remotely from the system. In some embodiments, the structured database 138 stores information or data described herein.

It will be understood that the structured database 138 may include any one or more storage devices, including, but not limited to, datastores, databases, and/or any of the other storage devices typically associated with a computer system. It will also be understood that the structured database 138 may store information in any known way, such as, for example, by using one or more computer codes and/or languages, alphanumeric character strings, data sets, figures, tables, charts, links, documents, and/or the like. Further, in some embodiments, the structured database 138 may include information associated with one or more applications, such as, for example, the system application 137. It will also be understood that, in some embodiments, the structured database 138 provides a substantially real-time representation of the information stored therein, so that, for example, when the processor 134 accesses the structured database 138, the information stored therein is current or substantially current.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

In addition, the various portions of the system environment 100 may be maintained for and/or by the same or separate parties. It will also be understood that the system 130 may include and/or implement any embodiment of the present invention described and/or contemplated herein. For example, in some embodiments, the system 130 is configured to implement any one or more of the embodiments of the process flows described and/or contemplated herein in connection any process flow described herein. Additionally, the system 130 or the user input system 140 is configured to initiate presentation of any of the user interfaces described herein.

Figure 2:
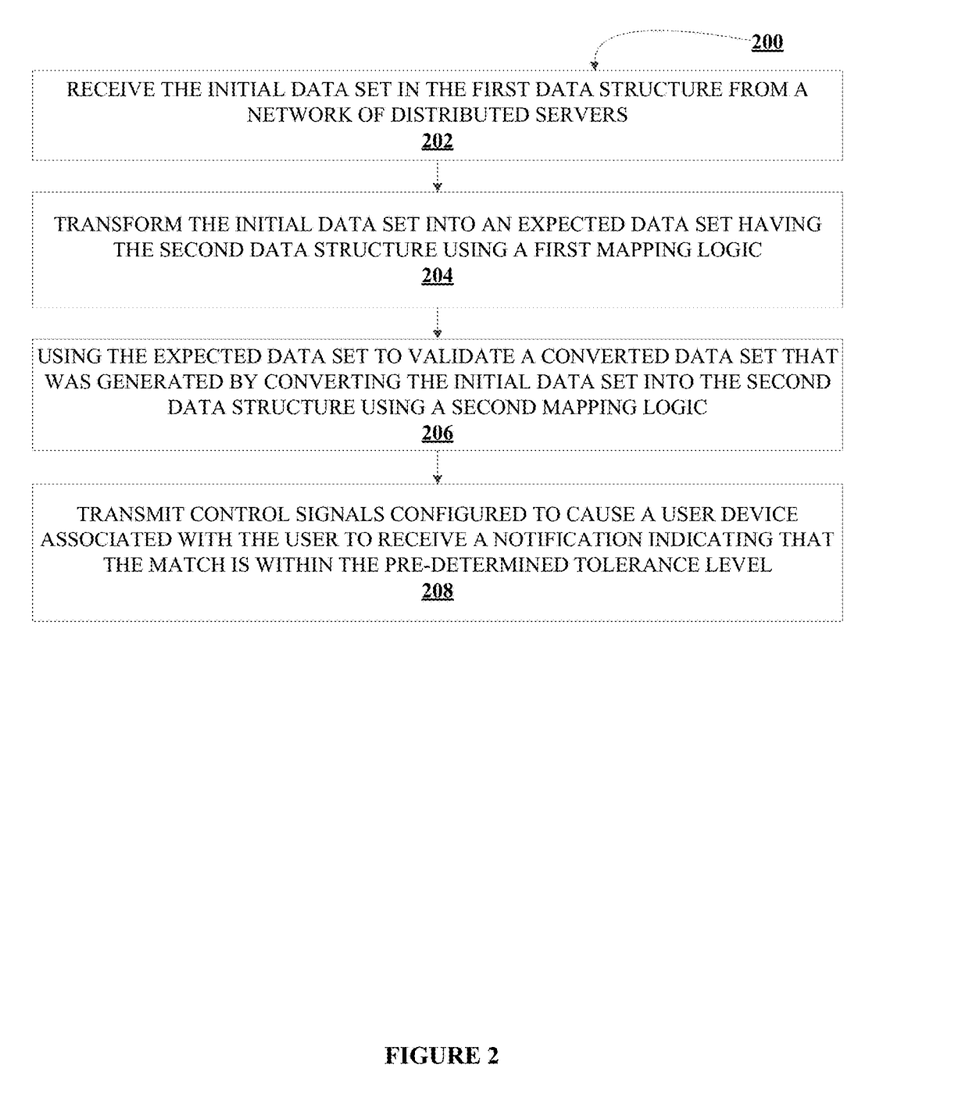
FIG. 2 illustrates a high level process flow for validating the data in accordance with an aspect of the present invention.

FIG. 2 illustrates a high level process flow for validating the data that has been converted from an initial data set having a first data structure to a converted data set having a second data structure during a data conversion procedure 200, in accordance with an embodiment of the invention. At block 202, the process flow includes receiving the initial data set in the first data structure from a network of distributed servers. In some embodiments, the initial data set may be primary data which includes information that has been collected from multiple sources (e.g., customer data, survey data, third party data, or the like). In one aspect, the initial data set may not be formatted or analyzed previously. In another aspect, the initial data set may refer to data aggregated from various applications within the entity. Typically, a data structure refers to a particular way of organizing large amounts of data to be used and managed efficiently.

Next, as shown in block 204, the process flow includes transforming the initial data set into an expected data set having the second data structure using a first mapping logic. In this regard, transforming the initial data set includes mapping one or more fields associated with the initial data set into one or more fields associated with the expected data set. Typically, a field is referred to as the smallest component under which data is entered through data capture or data entry. In one aspect, each field may include one or more elements. Typically, an element may refer to a unit of data. For example, an address field may include elements such as suite number, street name, city, state, and zip code.

In some embodiments, mapping the initial data set into the expected data set includes mapping the fields associated with the initial data set to the fields associated with the expected data set. In this regard, mapping of the one or more fields associated with the initial data set to one or more fields associated with the expected data set includes at least one of a one to one mapping, one to many mapping, many to many mapping, or many to one mapping. In one aspect, one to one mapping includes mapping each individual field associated with the initial data set to each individual field associated with the expected data set. In another aspect, one to many mapping includes mapping each individual field associated with the initial data set to a combination of one or more fields associated with the expected data set. In yet another aspect, many to many mapping includes mapping a combination of one or more fields associated with the initial data set to a combination of the one or more fields associated with the expected data set. In yet another aspect, many to one mapping includes mapping each individual field associated with the initial data set to a combination of the one or more fields associated with the expected data set.

Next, as shown in block 206, the process flow includes using the expected data set to validate a converted data set that was generated by converting the initial data set into the second data structure using a second mapping logic. In this regard, the system is configured to receive the converted set and compare the one or more fields associated with the expected data set with one or more fields associated with the converted data set. Typically, the converted data set is generated independently of the expected data set is generated by a third party by creating data element mappings between the fields associated with the initial data set. That said, validating the expected data set includes determining a match between the one or more fields associated with the expected data set and the one or more fields associated with the converted data set based on at least the comparison.

In response, the process flow includes transmitting control signals configured to cause a user device associated with the user to receive a notification indicating that the match is within the pre-determined tolerance level, as shown in block 208. In this regard, the system may be configured to establish a tolerance level associated with the matching. In one aspect, if the matching is within the pre-determined tolerance level, the system may be configured to transmit a notification to the user indicating that the expected data set and the converted data set matches. In this regard, the notification may be an audible alert, a vibratory alert, a flashing light, an email, a pop-up message, or the like.

Figure 3:
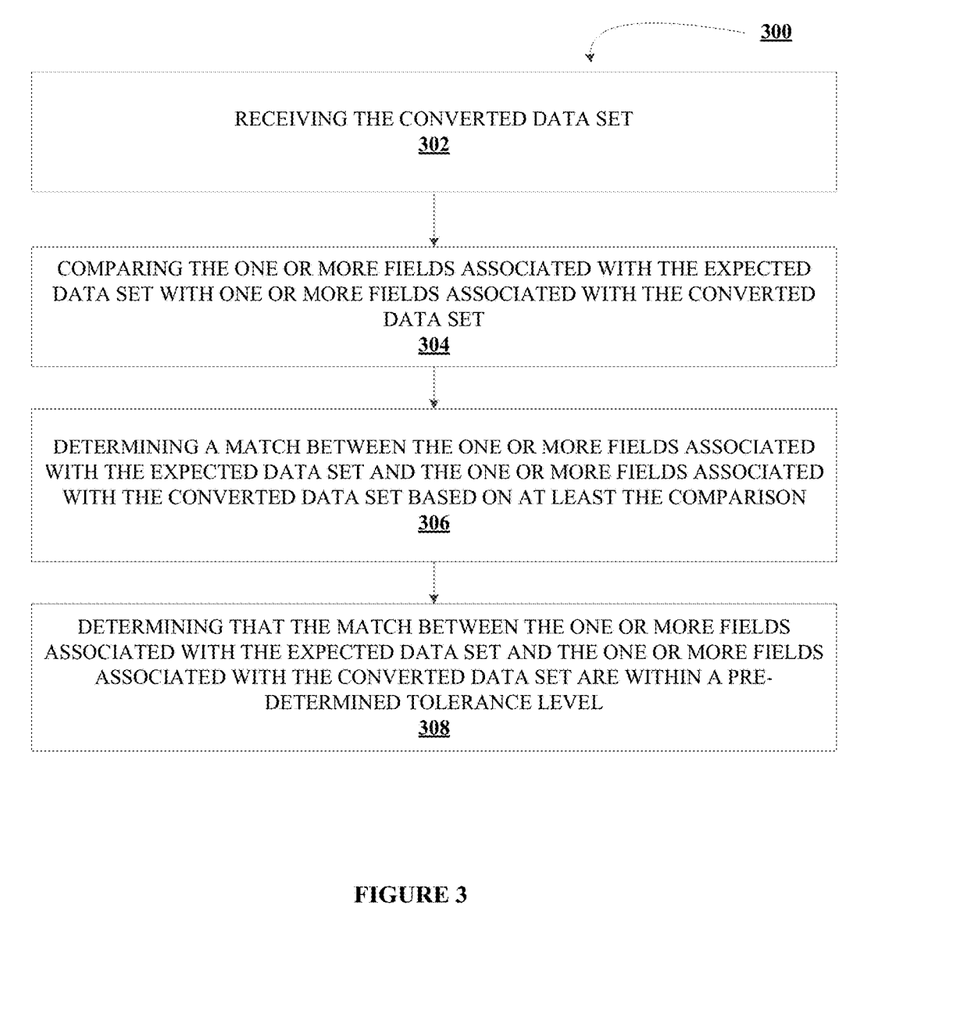
FIG. 3 illustrates a process flow for the validation of the expected data set in accordance with an aspect of the present invention.

FIG. 3 illustrates a process flow for the validation of the expected data set 300, in accordance with an embodiment of the invention. In some embodiments, the system may be configured to execute one or more compression techniques on one or more fields, elements, and/or sub-elements to increase the processing speed of the matching. In doing so, the present invention boasts a processing time of 29 hours for 27 billion elements across an expected data set of 85 million. Further, the system may be configured to execute the validation spreading the large expected data set over multiple independent job streams. In this way, the present invention reduces the processing time associated with the validation of the large expected data set by matching portions of the one or more fields associated the expected data set with the one or more fields associated with the converted data set using parallel processing. In some embodiments, the system may be configured to identify similar fields for grouping based on source file and similarity, thereby enabling efficient file reads and data look ups within the files.

As shown in block 302, the process flow includes receiving the converted data set. In response, the process flow includes comparing the one or more fields associated with the expected data set with one or more fields associated with the converted data set, as shown in block 304. The converted data set is the data set generated independently of the expected data set by a third party using a second mapping logic. In one aspect, the second mapping logic is different from the first mapping logic. In response, the process flow includes determining a match between the one or more fields associated with the expected data set and the one or more fields associated with the converted data set based on at least the comparison, as shown in block 306. In some embodiments, the system may be configured to execute the matching in the working memory responsible for transient holding of new and already stored information instead of executing disk reads to retrieve fields for each match.

In one aspect, matching the one or more fields associated with the expected data set with the one or more fields associated with the converted data set includes matching one or more elements of the one or more fields associated with the expected data set with one or more elements of the one or more fields associated with the converted data set, wherein each of the one or more elements comprises one or more sub-elements. By way of example, the field of address may include house number as one of the elements of the field and a sub-element may include a suite name. In one aspect, the system may be configured to receive one or more tolerance levels for matching the expected data set with the converted data set. In this regard, the system may be configured to receive a tolerance level for each field, a tolerance level for each element in each field, and/or a tolerance level for each sub-element in each element.

Next, as shown in block 306, the process flow includes determining that the match between the one or more fields associated with the expected data set and the one or more fields associated with the converted data set are within a pre-determined tolerance level. In some embodiments, the system may be configured to receive one or more weights associated with the one or more sub-elements, elements, or fields of the expected data set and/or the converted data set. In one aspect, the over-all tolerance level for matching each of the one or more fields associated with the expected data set and the one or more fields associated with the converted data set includes calculating a weighted average of the tolerance level for each field. In response, the system may be configured to determine whether the match is within an overall tolerance level.

Figure 4:
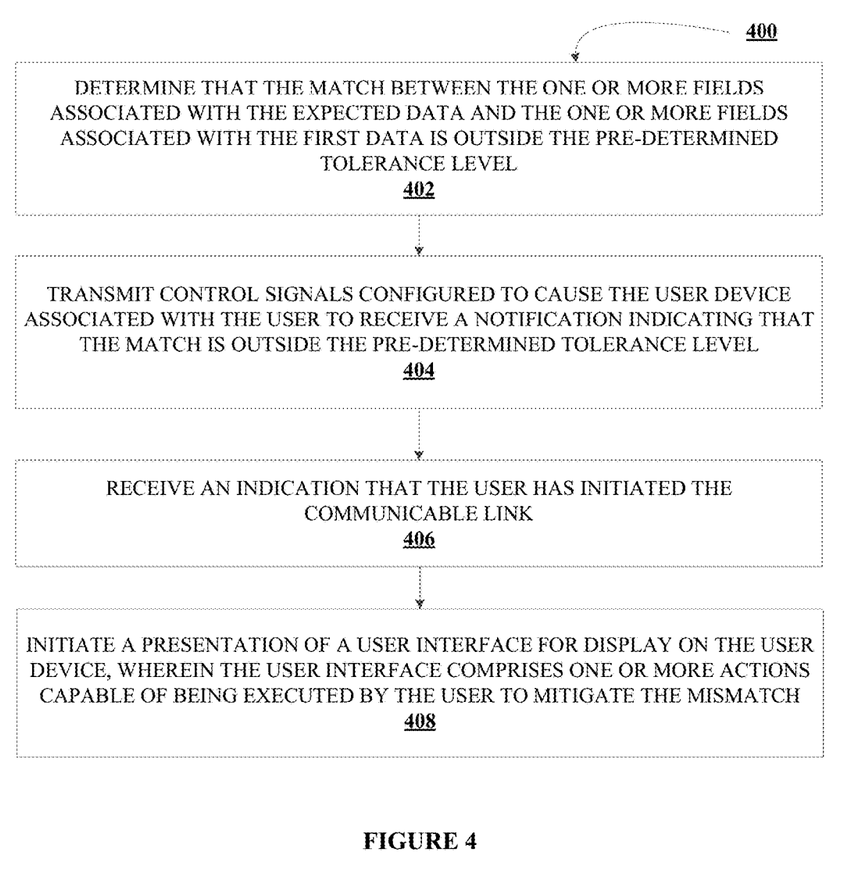
FIG. 4 illustrates a process flow for mitigating mismatches in accordance with an aspect of the present invention.

FIG. 4 illustrates a process flow for mitigating mismatches 400, in accordance with an embodiment of the invention. In this regard, as shown in block 402, the process flow includes determining that the match between the one or more fields associated with the expected data set and the one or more fields associated with the converted data set is outside the pre-determined tolerance level. In response, the process flow includes transmitting control signals configured to cause the user device associated with the user to receive a notification indicating that the match is outside the pre-determined tolerance level, as shown in block 404. In one aspect, the notification comprises an option to enable the user to initiate a communicable link with the database to retrieve one or more mitigation actions.

At block 406, the process flow includes receiving an indication that the user has initiated the communicable link. In one aspect, the system may be configured to present the notification as an activatable button on the user interface, to enable the user to initiate the communicable link by clicking or selecting the button on the user interface. In response to activating the button, the system may be configured to initiate presentation on the user interface, one or more actions capable of being executed by the user to mitigate the mismatch to ensure that the match between the one or more fields associated with the expected data set and the one or more fields associated with the converted data set is within the pre-determined tolerance level.

In response, the process flow includes initiating presentation on the user interface for display on the user device, one or more actions capable of being executed by the user to mitigate the mismatch, as shown in block 408. The user may select at least one of the one or more mitigation actions for implementation to ensure that the match between the one or more fields associated with the expected data set and the one or more fields associated with the converted data set is within the pre-determined tolerance level. In some embodiments, the one or more mitigation actions may include a user access to the one or more fields associated with the expected data set and/or the converted data set. In some other embodiments, the one or more mitigation actions may include a user access to the first mapping logic and/or the second mapping logic. In this regard, providing access may include enabling the user to modify, edit, delete or add information. In one aspect, providing access further comprises receiving authentication credentials from the user and validating the authentication credentials to provide access. In yet another embodiment, the one or more mitigation actions may include an execution of a mitigation subroutine capable of ensuring that the match is within the pre-determined threshold. In one aspect, ensuring that the match is within the pre-determined threshold includes at least one of modifying the fields to ensure a better match, increasing the tolerance level, and/or modifying the weights for at least the sub-elements, the elements, and/or the fields. In one aspect, the user associated with the expected data set may not have access to the converted data set. In this regard, the system may be configured to enable the user associated with the expected data set to transmit a message to the user associated with the converted data set to access the converted data set and execute a mitigation action to ensure that the match is within the pre-determined threshold.

In some embodiments, the system may be configured to generate a report at pre-determined periods of time indicating a number of mismatches. In one aspect, the report is generated during a time period when the validation is being performed thereby reporting in real-time or in near real-time. In response, the system may be configured to transmit the report to the user via the user interface for display on the user device. In some embodiments, the report may include one or more mismatches sorted based on the severity of the mismatch. In this regard, the severity of the mismatch may be based on the overall tolerance score calculated. In this way, the system may enable the user to prioritize the handling of mismatches.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for automating data validation of data that has been converted from an initial data set having a first data structure to a converted data set having a second data structure during a data conversion procedure, the system comprising:
   one or more memory devices;
   one or more processing devices operatively coupled to the one or more memory devices; and
   computer instruction code stored in the one or more memory devices and structured to cause the one or more processing devices to:
      receive the initial data set in the first data structure from a network of distributed servers;
      transform the initial data set into an expected data set having the second data structure using a first mapping logic, wherein transforming further comprises mapping one or more fields associated with the initial data set into one or more fields associated with the expected data set, wherein the transformed data is stored in a database as the expected data set;
      use the expected data set to validate the converted data set that was generated by converting the initial data set into the second data structure using a second mapping logic, wherein validating comprises:
         receiving the converted data set;
         detecting one or more similar fields associated with the converted data set and the expected dataset based on at least a source file associated with the converted data set and the expected dataset;
         grouping the one or more similar fields for comparison;
         comparing the one or more fields concurrently, wherein comparing further comprises comparing one or more elements of the one or more fields associated with the expected data set with one or more elements of the one or more fields associated with the converted data set, wherein each of the one or more elements comprises one or more sub-elements;
         determining a match between the one or more elements of the one or more fields associated with the expected data set and the one or more elements of the one or more fields associated with the converted data set based on at least the comparison;
         receiving one or more tolerance levels for matching the one or more fields associated with the expected data set and the one or more fields associated with the converted data set, wherein receiving further comprises receiving the one or more tolerance levels for each of the one or more elements of the one or more fields associated with the expected data set and the one or more sub-elements of the one or more elements of the one or more fields associated with the expected data set, and each of the one or more elements of the one or more fields associated with the converted data set and the one or more sub-elements of the one or more elements of the one or more fields associated with the converted data set;
         receiving one or more weights associated with the one or more elements of the one or more fields associated with the expected data set and one or more elements of the one or more fields associated with the converted data set;
         calculating an overall tolerance level for matching each of the one or more fields associated with the expected data set and the one or more fields associated with the converted data set based on at least the one or more weights, wherein calculating further comprises calculating a weighted average of the one or more tolerance levels for each of the one or more fields; and
         determining that the match is within the overall tolerance level; and
      transmit control signals configured to cause a user device associated with a user to receive a notification indicating that the match is within the overall tolerance level.

2. The system of claim 1, wherein the one or more processing devices are configured to execute computer-readable code to further cause the one or more processing devices to:
   determine that the match between the one or more fields associated with the expected data set and the one or more fields associated with the converted data set is outside the overall tolerance level resulting in a mismatch;
   transmit control signals configured to cause the user device associated with the user to receive a notification indicating that the match is outside the overall tolerance level, wherein the notification comprises an option to enable the user to initiate a communicable link with the database;
   receive an indication that the user has initiated the communicable link;
   initiate a presentation of a user interface for display on the user device, wherein the user interface comprises one or more actions capable of being executed by the user to mitigate the mismatch to ensure that the match between the one or more fields associated with the expected data set and the one or more fields associated with the converted data set is within the overall tolerance level; and transmit control signals configured to cause a user device associated with the user to receive a notification indicating that the match is within the overall tolerance level, wherein the notification comprises an audible alert.

3. The system of claim 1, wherein the first mapping logic comprises mapping the one or more fields associated with the initial data set to one or more fields associated with the expected data set comprises at least one of a one to one mapping, one to many mapping, many to many mapping, or many to one mapping, wherein one to one mapping comprises mapping each individual field associated with the initial data set to each individual field associated with the expected data set, wherein one to many mapping comprises mapping each individual field associated with the initial data set to a combination of one or more fields associated with the expected data set, wherein many to many mapping comprises mapping a combination of one or more fields associated with the initial data set to a combination of the one or more fields associated with the expected data set, wherein many to one mapping comprises mapping each individual field associated with the initial data set to a combination of the one or more fields associated with the expected data set.

4. The system of claim 1, wherein the one or more processing devices are configured to execute computer-readable code to further cause the one or more processing devices to:

generate a report at pre-determined periods of time indicating a number of mismatches, wherein the report is generated during a time period when the validation is being performed; and transmit the report to the user via the user interface for display on the user device.

5. A computer program product for automating data validation of data that has been converted from an initial data set having a first data structure to a converted data set having a second data structure during a data conversion procedure, the computer program product comprising a non-transitory computer-readable medium comprising code causing a first apparatus to:

receive the initial data set in the first data structure from a network of distributed servers;

transform the initial data set into an expected data set having the second data structure using a first mapping logic, wherein transforming further comprises mapping one or more fields associated with the initial data set into one or more fields associated with the expected data set, wherein the transformed data is stored in a database as the expected data set;

use the expected data set to validate the converted data set that was generated by converting the initial data set into the second data structure using a second mapping logic, wherein validating comprises:

receiving the converted data set;

detecting one or more similar fields associated with the converted data set and the expected dataset based on at least a source file associated with the converted data set and the expected dataset;

grouping the one or more similar fields for comparison;

comparing the one or more fields concurrently, wherein comparing further comprises comparing one or more elements of the one or more fields associated with the expected data set with one or more elements of the one or more fields associated with the converted data set, wherein each of the one or more elements comprises one or more sub-elements;

determining a match between the one or more elements of the one or more fields associated with the expected data set and the one or more elements of the one or more fields associated with the converted data set based on at least the comparison;

receiving one or more tolerance levels for matching the one or more fields associated with the expected data set and the one or more fields associated with the converted data set, wherein receiving further comprises receiving the one or more tolerance levels for each of the one or more elements of the one or more fields associated with the expected data set and the one or more sub-elements of the one or more elements of the one or more fields associated with the expected data set, and each of the one or more elements of the one or more fields associated with the converted data set and the one or more sub-elements of the one or more elements of the one or more fields associated with the converted data set;

receiving one or more weights associated with the one or more elements of the one or more fields associated with the expected data set and one or more elements of the one or more fields associated with the converted data set;

calculating an overall tolerance level for matching each of the one or more fields associated with the expected data set and the one or more fields associated with the converted data set based on at least the one or more weights, wherein calculating further comprises calculating a weighted average of the one or more tolerance levels for each of the one or more fields; and determining that the match is within the overall tolerance level; and transmit control signals configured to cause a user device associated with a user to receive a notification indicating that the match is within the overall tolerance level.

6. The computer program product of claim 5, wherein the first apparatus is further configured to cause a processor to:

determine that the match between the one or more fields associated with the expected data set and the one or more fields associated with the converted data set is outside the overall tolerance level resulting in a mismatch;

transmit control signals configured to cause the user device associated with the user to receive a notification indicating that the match is outside the overall tolerance level resulting in a mismatch, wherein the notification comprises an option to enable the user to initiate a communicable link with the database;

receive an indication that the user has initiated the communicable link;

initiate a presentation of a user interface for display on the user device, wherein the user interface comprises one or more actions capable of being executed by the user to mitigate the mismatch to ensure that the match between the one or more fields associated with the expected data set and the one or more fields associated with the converted data set is within the overall tolerance level; and transmit control signals configured to cause a user device associated with the user to receive a notification indicating that the match is within the overall tolerance level, wherein the notification comprises an audible alert.

7. The computer program product of claim 5, wherein the first mapping logic comprises mapping the one or more fields associated with the initial data set to one or more fields associated with the expected data set comprises at least one of a one to one mapping, one to many mapping, many to many mapping, or many to one mapping, wherein one to one mapping comprises mapping each individual field associated with the initial data set to each individual field associated with the expected data set, wherein one to many mapping comprises mapping each individual field associated with the initial data set to a combination of one or more fields associated with the expected data set, wherein many to many mapping comprises mapping a combination of one or more fields associated with the initial data set to a combination of the one or more fields associated with the expected data set, wherein many to one mapping comprises mapping each individual field associated with the initial data set to a combination of the one or more fields associated with the expected data set.

8. The computer program product of claim 5, wherein the first apparatus is further configured to cause a processor to:
   generate a report at pre-determined periods of time indicating a number of mismatches, wherein the report is generated during a time period when the validation is being performed; and
   transmit the report to the user via the user interface for display on the user device.

9. A computer implemented method for automating data validation of data that has been converted from an initial data set having a first data structure to a converted data set having a second data structure during a data conversion procedure, the method comprising:
   receiving, using a computing device processor, the initial data set in the first data structure from a network of distributed servers;
   transforming, using a computing device processor, the initial data set into an expected data set having the second data structure using a first mapping logic, wherein transforming further comprises mapping one or more fields associated with the initial data set into one or more fields associated with the expected data set, wherein the transformed data is stored in a database as the expected data set;
   validating, using a computing device processor, the converted data set that was generated by converting the initial data set into the second data structure using a second mapping logic using the expected data set, wherein validating further comprises:
   receiving the converted data set;
   detecting one or more similar fields associated with the converted data set and the expected dataset based on at least a source file associate with the converted data set and the expected dataset;
   grouping the one or more similar fields for comparison;
   comparing the one or more fields concurrently, wherein comparing further comprises comparing one or more elements of the one or more fields associated with the expected data set with one or more elements of the one or more fields associated with the converted data set, wherein each of the one or more elements comprises one or more sub-elements;
   determining a match between the one or more elements of the one or more fields associated with the expected data set and the one or more elements of the one or more fields associated with the converted data set based on at least the comparison;
   receiving one or more tolerance levels for matching the one or more fields associated with the expected data set and the one or more fields associated with the converted data set, wherein receiving further comprises receiving the one or more tolerance levels for each of the one or more elements of the one or more fields associated with the expected data set and the one or more sub-elements of the one or more elements of the one or more fields associated with the expected data set, and each of the one or more elements of the one or more fields associated with the converted data set and the one or more sub-elements of the one or more elements of the one or more fields associated with the converted data set;
   receiving one or more weights associated with the one or more elements of the one or more fields associated with the expected data set and one or more elements of the one or more fields associated with the converted data set;
   calculating an overall tolerance level for matching each of the one or more fields associated with the expected data set and the one or more fields associated with the converted data set based on at least the one or more weights, wherein calculating further comprises calculating a weighted average of the one or more tolerance levels for each of the one or more fields; and
   determining that the match is within the overall tolerance level; and
   transmit control signals configured to cause a user device associated with a user to receive a notification indicating that the match is within the overall tolerance level.

10. The computer implemented method of claim 9, wherein the method further comprises:
    determining that the match between the one or more fields associated with the expected data set and the one or more fields associated with the converted data set is outside the overall tolerance level resulting in a mismatch;
    transmitting control signals configured to cause the user device associated with the user to receive a notification indicating that the match is outside the overall tolerance level resulting in a mismatch, wherein the notification comprises an option to enable the user to initiate a communicable link with the database;
    receiving an indication that the user has initiated the communicable link;
    initiating a presentation of a user interface for display on the user device, wherein the user interface comprises one or more actions capable of being executed by the user to mitigate the mismatch to ensure that the match between the one or more fields associated with the expected data set and the one or more fields associated with the converted data set is within the overall tolerance level; and
    transmitting control signals configured to cause a user device associated with the user to receive a notification indicating that the match is within the overall tolerance level, wherein the notification comprises an audible alert.

11. The computer implemented method of claim 9, wherein the first mapping logic comprises mapping the one or more fields associated with the initial data set to one or more fields associated with the expected data set comprises at least one of a one to one mapping, one to many mapping, many to many mapping, or many to one mapping, wherein one to one mapping comprises mapping each individual field associated with the initial data set to each individual field associated with the expected data set, wherein one to many mapping comprises mapping each individual field associated with the initial data set to a combination of one or more fields associated with the expected data set, wherein many to many mapping comprises mapping a combination of one or more fields associated with the initial data set to a combination of the one or more fields associated with the expected data set, wherein many to one mapping comprises mapping each individual field associated with the initial data set to a combination of the one or more fields associated with the expected data set.

12. The system of claim 1, wherein the module is further configured to execute one or more compression techniques on the one or more fields, the one or more elements, and the one or more sub-elements to increase a processing speed of the matching.

13. The computer program product of claim 5, wherein the first apparatus is further configured to execute one or more compression techniques on the one or more fields, the one or more elements, and the one or more sub-elements to increase a processing speed of the matching.

14. The computer implemented method of claim 9, wherein the method further comprises executing one or more compression techniques on the one or more fields, the one or more elements, and the one or more sub-elements to increase a processing speed of the matching.

15. The system of claim 2, wherein the module is further configured to mitigate the mismatch, wherein mitigating further comprises providing a user access to the one or more fields associated with the expected data set and the converted data set, wherein providing the user access further comprises receiving authentication credentials from the user and validating the authentication credentials to provide the user access.

16. The computer program product of claim 6, wherein the first apparatus is further configured to mitigate the mismatch, wherein mitigating further comprises providing a user access to the one or more fields associated with the expected data set and the converted data set, wherein providing the user access further comprises receiving authentication credentials from the user and validating the authentication credentials to provide the user access.

17. The computer implemented method of claim 10, wherein mitigating further comprises providing a user access to the one or more fields associated with the expected data set and the converted data set, wherein providing the user access further comprises receiving authentication credentials from the user and validating the authentication credentials to provide the user access.

* * * * *